US006023022A

United States Patent [19]

Nakamura et al.

[11] Patent Number: 6,023,022

[45] Date of Patent: Feb. 8, 2000

[54] CONNECTING STRUCTURE BETWEEN FLAT CABLE AND WIRES

[75] Inventors: Kazuto Nakamura; Hiromi Masuda, both of Shizuoka-ken, Japan

[73] Assignee: Yazaki Corporation, Tokyo, Japan

[21] Appl. No.: 09/110,296

[22] Filed: Jul. 6, 1998

[30] Foreign Application Priority Data

Jul. 8, 1997 [JP] Japan .................................... 9-182591

[51] Int. Cl.$^{7}$ ................................ H01R 4/00; H02G 3/06

[52] U.S. Cl. ...................................... 174/88 R; 174/117 F

[58] Field of Search ............................... 174/84 R, 88 R, 174/117 F; 439/492, 499, 874

[56] References Cited

U.S. PATENT DOCUMENTS

| | | | |
|---|---|---|---|
| 5,057,650 | 10/1991 | Urushibata et al. | 174/88 R |
| 5,264,663 | 11/1993 | Noguchi et al. | 174/84 R |
| 5,770,818 | 6/1998 | Tanaka et al. | 174/84 R |
| 5,821,465 | 10/1998 | Tanaka et al. | 174/88 R |
| 5,824,955 | 10/1998 | Saiso et al. | 174/88 R |

FOREIGN PATENT DOCUMENTS

| | | |
|---|---|---|
| 4-267087 | 9/1992 | Japan . |
| 9-102337 | 4/1997 | Japan . |

*Primary Examiner*—Kristine Kincaid
*Assistant Examiner*—Chau N. Nguyen
*Attorney, Agent, or Firm*—Finnegan, Henderson, Farabow, Garrett & Dunner, L.L.P.

[57] ABSTRACT

A case body having first and second case bodies. A bus bar having a plurality of terminals and a tie bar integrally connecting the terminals to each other. A wire is positioned by a holder engaged with an engaging portion on the first case body. The bus bar and the flat cable are positioned by an engagement between a through hole thereof and a projecting portion on the first case. In a state of being positioned, a core wire, the terminal and a conductor portion are mutually connected to each other. The first and second case bodies are joined in a state of being positioned in the above manner. The tie bar is cut and a plurality of terminals are held within the case body in such a manner as to be mutually independent from each other. In accordance with this structure, a relative positioning among the wire, the bus bar and the flat cable is performed by a structural engagement between each of the members and the case body without using an insert molding. Accordingly, an operability is improved and a cost is reduced.

19 Claims, 5 Drawing Sheets

CONNECTING STRUCTURE BETWEEN FLAT CABLE AND WIRES

BACKGROUND OF THE INVENTION

The present invention relates to a connecting structure for connecting a flat cable and wires through a bus bar in a conductive manner, for example, a connecting structure applied to an electrical connection of a steering apparatus in an automotive vehicle.

Generally, since a flat cable is constituted by a plurality of thin conductor portions, and a thin flexible resin film covering both surfaces of the conductor portions, it is weak against an external force. Accordingly, it is hard to directly connect the flat cable and the wires disposed in an outer portion, so that the flat cable and the wires are connected through the bus bar.

A connecting structure disclosed in Japanese Patent Application Laid-Open No. 4-267087 is shown in FIGS. 1A and 1B.

A flat cable 102 and a wire 103 are connected through a bus bar 101. The bus bar 101 has four terminals 101*a* and a connecting portion 101*b* integrally connecting between the respective terminals 101*a*. The terminals 101*a* are disposed in parallel at a fixed interval.

A conductor portion 2*a* of the flat cable 102 is welded to an end of the terminal 101*a*. A core wire 103*a* of a wire 103 is welded to the other end of the terminal 101*a*. An area (an area surrounded by a two-dot chain line in FIG. 1B) from an end portion of a coated portion 102*b* of the flat cable 102 to an end portion of a coated portion 103*b* of the wire 103 including the bus bar 101 is coated by a resin 100 by means of an insert molding. The connecting portion 101*b* is cut away after the insert molding, so that a mutual connection between the terminals 101*a* is broken. Accordingly, the conductor portion 102*a* of the flat cable 102 and the core wire 103*a* of the wire 103 are conducted one by one.

In the connecting structure mentioned above, it is known that the terminal before connection is previously arranged in the case body by an insert molding (refer to Japanese Patent Application Laid-Open No. 9-102337).

However, in the connecting structure mentioned above, the flat cable 102 and the wire 103 are positioned and fixed with respect to the bus bar 101 (the terminal 101*a*) by an insert molding. Accordingly, an insert molding process is required, so that an easiness of an assembly is deteriorated due to an increase of a number of the processes. Further, since the insert molding is required, a cost increase is involved.

SUMMARY OF THE INVENTION

Accordingly, an object of the, present invention is to provide a connecting structure which requires no insert molding, improves an operability and reduces a cost.

In order to achieve the above object, in accordance with a first aspect of the present invention, there is provided a connecting structure between a flat cable and wires, comprising:

a flat cable having first conductors and a first insulated coating for covering the first conductors, the first conductors including first connecting portions exposing at an end portion of the flat cable from the first coating;

a plurality of wires, each of the wires having a second conductor and a second insulated coating for covering the second conductor, and the second conductor including second connecting portion exposing at an end of the wire from the second coating;

a bus bar having terminals and a tie bar, the terminals being disposed within a predetermined plane in parallel, the tie bar integrally connecting the terminals within the predetermined plane, and the tie bar including a removed portion cut away such that the terminals are mutually out of contact with each other;

a holder for positioning the end portions of the wires with respect to the terminals; and a case comprising a first case body and a second case body, the second case body being mounted to the first case body so as to cover a connecting surface of the first case body, the first case body having a first engaging portion engageable with the holder, a second engaging portion engageable with the bus bar and a third engaging portion engageable with the flat cable, the terminals respectively being positioned at predetermined positions on the connecting surface when the bus bar is engaged with the second engaging portion, the holder positioning the wires with respect to the bus bar on the connecting surface when the holder is engaged with the first engaging portion, the flat cable being positioned with respect to the bus bar on the connecting surface when the flat cable is engaged with the third engaging portion, the second connecting portions positioned by an engagement between the holder and the first engaging portion being respectively connected to the terminals, the first connecting portions positioned by an engagement between the flat cable and the third engaging portion being respectively connected to the terminals, the terminals, the end portions of the wires and the end portions of the flat cable being covered by the second case body when the second case body is mounted to the first case body, and the removed portion being cut away with the first and second connecting portions connected to the terminals.

In accordance with the first aspect, the wire, the bus bar and the flat cable are mutually connected to each other in a state of being mutually positioned with each other by an engagement between the wire, the bus bar and the flat cable and the first, second and third engaging portions of the first case body, respectively. The connecting portions are covered by the first and second case bodies with maintaining a positioning.

Accordingly, since a relative positioning between the members is performed by a structural engagement of each of the members with respect to the first case body without an insert molding, an operability is improved and a cost is reduced.

In accordance with a second aspect of the present invention, there is provided a connecting structure according to the first aspect, wherein the second engaging portion is engaged with remaining portions of the bus bar except the removed portion, and an engagement between the second engaging portion and the remaining portions holds the terminals at the predetermined positions when the removed portion is cut away.

In accordance with the second aspect, the terminal is held at the predetermined position by an engagement between the remaining portions and the second engaging portion after the removed portion of the tie bar is cut away. Accordingly, the second aspect provides a connecting structure having a high strength against a tension applied to the flat cable or the wire.

In accordance with a third aspect of the present invention, there is provided a connecting structure according to the first aspect, wherein the terminals respectively have first through holes, and the second engaging portions are first projections fitted in the first through holes and disposed on the connecting surface, the second case body has a third through hole;

a tip of the first projection is inserted into the third through hole and projects from the second case body when the second case body covers the connecting surface of the first case body, and the tip of the first projection projecting from the second case body is thermally welded to the second case body, whereby the second case body is fixed to the first case body.

In accordance with a fourth aspect of the present invention, there is provided a connecting structure according to the first aspect, wherein the flat cable has a second through hole, the third engaging portion is a second projection fitted in the second through hole and disposed on the connecting surface, the second case body has a fourth through hole, a tip of the second projection is inserted into the fourth through hole and projects from the second case body when the second case body covers the connecting surface of the first case body, and the tip of the second projection projecting from the second case body is thermally welded to the second case body, whereby the second case body is fixed to the first case body.

In accordance with the third and fourth aspects, since the second case body is fixed to the first case body by using the first and second projections for positioning, the other structure for connecting the case bodies to each other is not required. Accordingly, a structure can be made simple, and the case body is made compact.

In accordance with a fifth aspect of the present invention, there is provided a connecting structure according to the first aspect, wherein the second connecting portions are overlapped on the first connecting portions on the terminals.

In accordance with the fifth aspect, the wire and the flat cable can be connected for one time (for example, can be connected by a ultrasonic irradiation for one time). Accordingly, a connecting operation can be made simple.

In accordance with a sixth aspect of the present invention, there is provided a connecting structure according to the first aspect, wherein one of the first and second case bodies has an engaging recess portion, the other of the first and second case bodies has an engaging claw engageable with the engaging recess portion, and the second case body is fixed to the first case body when the engaging claw is engaged with the engaging recess portion.

In accordance with the sixth aspect, the second case body is taken out from the first case body by removing an engagement between the engaging claw and the engaging recess portion. Accordingly, a maintenance operation can be easily performed.

DESCRIPTION OF THE PREFERRED EMBODIMENTS

An embodiment of the present invention will be described below with reference to the drawings.

FIGS. 2, 3A, 3B and 3C show a connecting structure in accordance with a first embodiment.

Figure 1A:
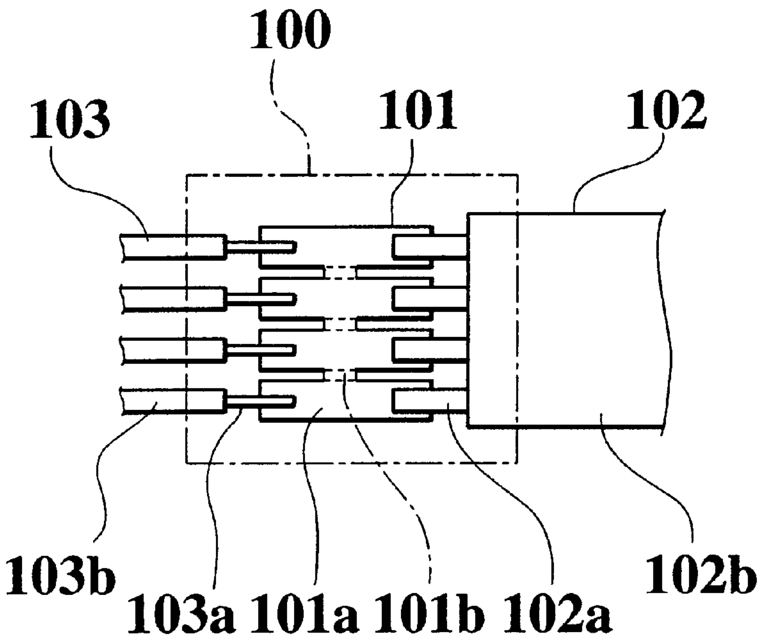
FIG.1A PRIOR ART
FIG. 1A is a plan view which shows a conventional connecting structure.
Figure 1B:
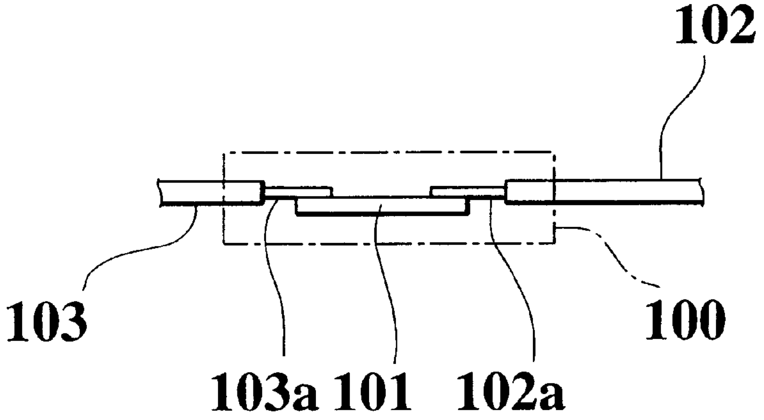
FIG.1B PRIOR ART
FIG. 1B is a side elevational view which shows a conventional connecting structure.
Figure 2:
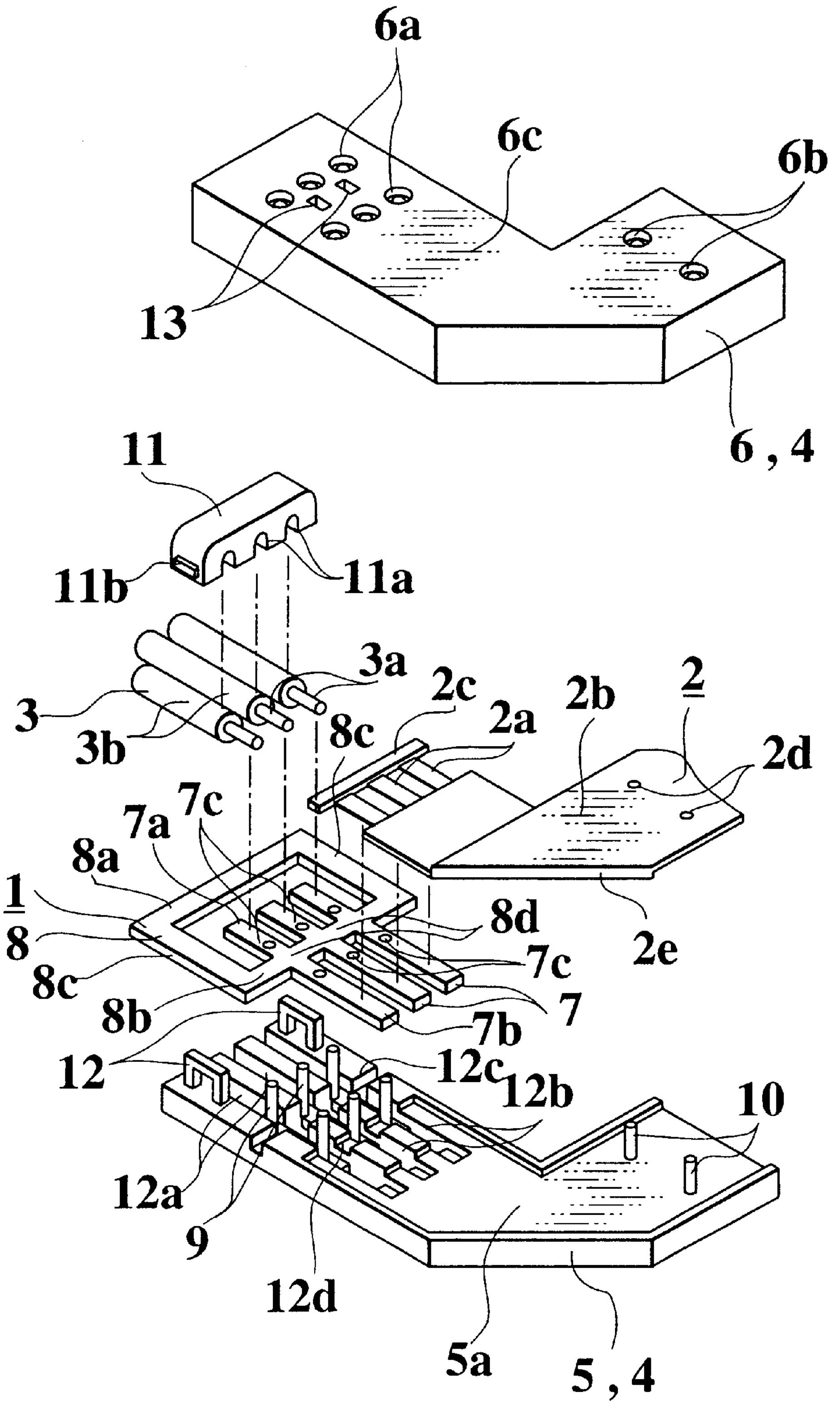
FIG. 2 is an exploded perspective view which shows a connecting structure in accordance with a first embodiment of the present invention.

As shown in FIG. 2, a conductor portion *2a* of a flat cable 2 and a core wire *3a* of a wire 3 is directly connected to each other through a bus bar 1 corresponding to a connecting base member. The bus bar 1, and respective coated portions *2b* and *3b* of the flat cable 2 and the wire 3 which are adjacent to the bus bar are coated by a case body 4.

Figure 3A:
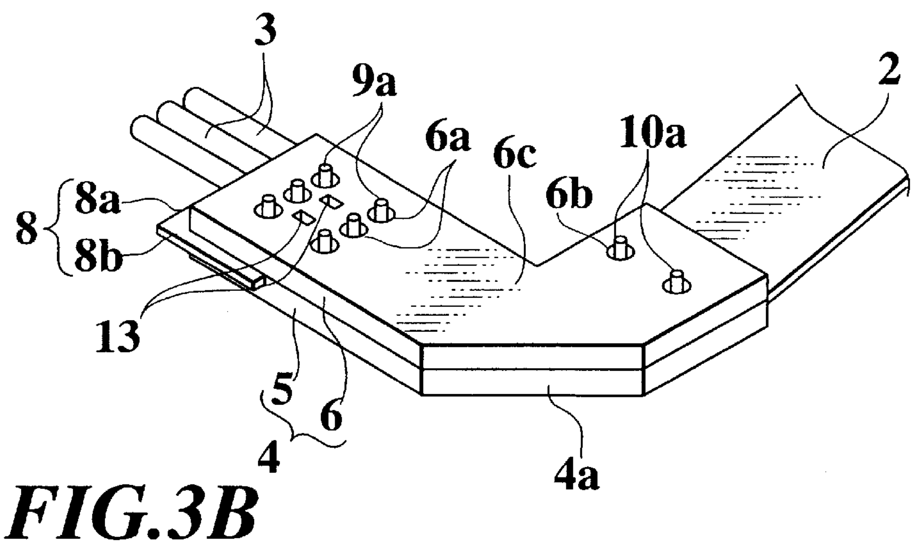
FIG. 3A is a perspective view which shows first and second case bodies before welding.
Figure 3B:
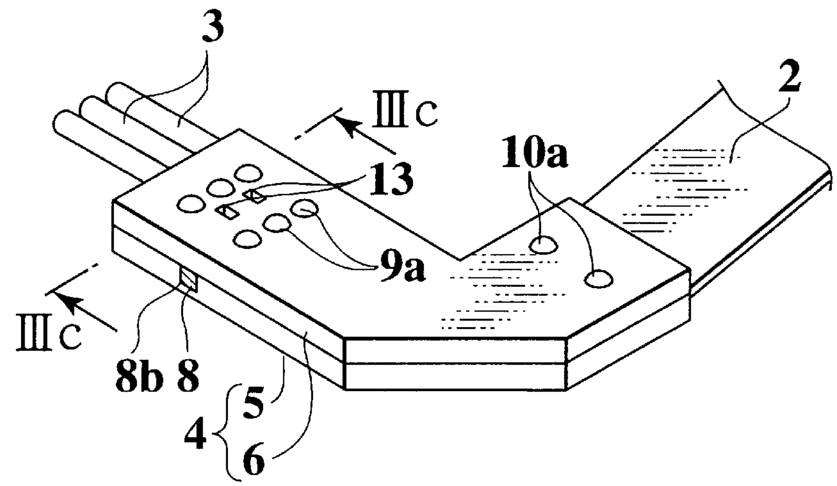
FIG. 3B is a perspective view which shows first and second case bodies after welding.

As shown in FIGS. 3A and 3B, the wire 3 and the flat cable 2 are respectively introduced outward from an end and the other end of the case body 4. The flat cable 2 is set within the case body 4 in a state of being obliquely bent backward at a bending portion *2e* and being bent in a substantially perpendicular direction. The case body 4 is formed in a substantially L shape having an inclined surface *4a* extending along the bending portion *2e* of the flat cable 2.

The conductor portion *2a* exposed from a remaining coated portion *2c* is formed in an end portion of the flat cable 2. A through hole *2d* is formed in the middle of the coated portion *2b* continuously extending from the remaining coated portion *2c*. The wire 3 has the core wire *3a* with the coated portion *3b* removed and exposed in the end portion thereof.

The case body 4 is separated into two portions comprising a first case body 5 and a second case body 6.

The bus bar 1 is provided with three terminals 7 and a tie bar 8. The terminals 7 are disposed in parallel. The core wire *3a* of the wire 3 and the conductor portion *2a* of the flat cable 2 is connected to the terminal 7. The tie bar 8 is formed in a loop shape within the same plane. The tie bar 8 integrally connects three terminals 7 to each other.

The tie bar 8 has a first edge portion 8*a*, a second edge portion 8*b* including connecting portion 8*d* connecting center portions of the terminal 7 to each other, and both side edge portions 8*c* and 8*c* connecting between the respective end portions of the first edge portion 8*a* and the second edge portion 8*b*. A through hole 7*c* is formed in each of a first portion 7*a* and a second portion 7*b* positioned at both sides of the center portion of each of the terminals 7.

A central groove portion 12*c* crossing the first case body 5 in a widthwise direction, a first groove portion 12*a* and a second groove portion 12*b* respectively crossing in a perpendicular direction to the central groove portion 12*c*, and a lateral groove portion 12*d* crossing in a perpendicular to the second groove portion 12*b* are formed in an end of the connecting surface 5*a* of the first case body 5. Parts of the first groove portion 12*a* and the second groove portion 12*b* are penetrated for inserting a device for ultrasonic welding.

First, second and third engaging portions respectively engaging with a holder 11 for positioning the wire 3, the bus bar 1 and the flat cable 2 are formed on the connecting surface 5*a* of the first case body 5. The first engaging portion is constituted by an inverse-U shaped engaging portion 12 adhered to the connecting surface 5*a* at an opening side. A pair of engaging portions 12 are provided in both sides of an end of the connecting surface 5*a*. The second and third engaging portions are respectively constituted by column-shaped projecting portions 9 and 10 protruding from the connecting surface 5*a*. The projecting portion 9 is disposed within each of the grooves of the first groove portion 12*a* and the second groove portion 12*b* one by one. The projecting portion 10 is projected in the other end side of the connecting surface 5*a*.

The holder 11 is constituted by a cube having a length substantially equal to a distance between the pair of first engaging portions 12 and 12. A groove portion 11*a* is open in a lower surface of a rectangular solid. Engaging pawls 11*b* respectively engaging with the pair of first engaging portions 12 and 12 are formed in both side portions of the rectangular solid.

The second case body 6 has a contour substantially the same as the first case body 5. The second case body 6 has a U-shaped cross section capable of receiving the engaging portion 12 and the holder 11 of the first case body 5 at a time of connecting to the first case body 5 (refer to FIG. 3C). Through holes 6*a*, 6*b* and 13 are formed on an upper surface 6*c* of the second case body 6. When the first and second case bodies 5 and 6 are connected to each other, respective tip ends 9*a* and 10*a* of the projecting portions 9 and 10 are respectively projected outward through the through holes 6*a* and 6*b*. When the first and second case bodies 5 and 6 are connected to each other, the through hole 13 is positioned on a connecting portion 8*d* of the bus bar 1 set in the first case body 5.

The flat cable 2 and the wire 3 are electrically connected to each other in the following manner.

At first, the bus bar 1 is set to the first case body 5. This setting is performed by fitting respective through holes 7*c* and 7*c* of a first portion 7*a* and a second portion 7*b* of the terminal 7 to the projecting portions 9 and 9. Accordingly, the first portion 7*a* and the second portion 7*b* of the terminal 7 are respectively fitted into the first groove portion 12*a* and the second groove portion 12*b*, the second edge portion 8*b* of the tie bar 8 is fitted into the central groove portion 12*c*, and the first edge portion 8*a* and the both side edge portions 8*c* and 8*c* of the tie bar 8 are positioned along an outer peripheral portion of the one end of the first case body 5 (refer to FIG. 3A). Accordingly, the bus bar 1 is positioned at a predetermined position. Since the bus bar 1 is a single part constituted by a plurality of terminals 7 connected by the tie bar 8, a positioning of the respective terminals 7 is simultaneously performed by a positioning of the bus bar 1.

Next, the flat cable 2 and the wire 3 are set in the first case body 5.

The remaining coated portion 2*c* is fitted to the lateral groove portion 12*d*, and the through hole 2*d* of the coated portion 2*b* is fitted into the projecting portion 10, so that the flat cable 2 is set. In this set state, the conductor portion 2*a* of the flat cable 2 is put on the second portion 7*b* of the terminal 7.

Figure 3C:
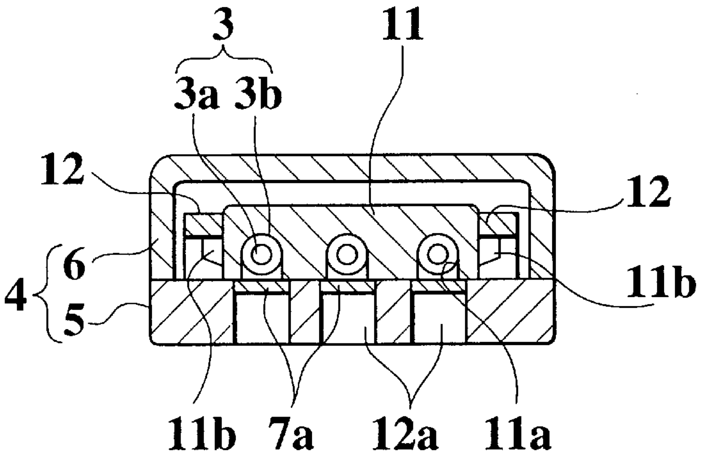
FIG. 3C is a cross sectional view along a line IIIC—IIIC in FIG. 3B.

The coated portion 3*b* of the wire 3 is fitted to the groove portion 11*a* of the holder 11, and the holder 11 is engaged with a portion between a pair of engaging portions 12 and 12, so that the wire 3 is set. In this set state, as shown in FIG. 3C, a part of the coated portion 3*b* of the wire and the core wire 3*a* are positioned in such a manner as to be aligned on the first portion 7*a* of the terminal 7.

After the bus bar 1, the flat cable 2 and the wire 3 are set in the first case body 5, the core wire 3 of the wire 3 and the conductor portion 2*a* of the flat cable 2 are respectively connected to the first portion 7*a* and the second portion 7*b* of the terminal 7 of the bus bar 1. This connection is, for example, performed by a ultrasonic welding.

Next, the second case body 6 is connected to the first case body 5. Concretely speaking, the second case body 6 is put on the first case body 5 in a state of maintaining the positioning between the respective members 1, 2 and 3 mentioned above. The coated state is structured such that, as shown in FIGS. 3A and 3C, the engaged holder 11 is received therewithin as it is and the respective tips 9*a* and 10*a* of the projecting portions 9 and 10 are projected outward from the through holes 6*a* and 6*b* of the upper surface 6*c* in the second case body 6. Further, the wire 3 and the flat cable 2 are respectively introduced outward from joining portions at the one end and the other end of the first case body 5 and the second case body 6, and the first edge portion 8*a* and the both side edge portions 8*c* and 8*c* of the tie bar are positioned at an outer portion of the first and second case bodies 5 and 6.

Next, the second case body 6 is fixed to the first case body 5 by thermally welding the respective tips 9*a* and 10*a* of the projecting portions 9 and 10 with keeping this coated state. Further, the first edge portion 8*a*, the both side edge portions 8*c* and 8*c* and the connecting portion 8*d* of the tie bar 8 are cut and removed. As shown in FIG. 3B, the first edge portion 8*a* and the both side edge portions 8*c* and 8*c* are removed in a C shape manner by cutting the both end portions of the second edge portion 8*b* of the tie bar 8. Further, the connecting portion 8*d* is cut and removed through the through holes 13 and 13 formed on the upper surface 6*c* of the second case body 6. A cutting at this time is performed by, for example, using a means such as a press and the like. A plurality of terminals 7 and 7 become independent from each other with breaking a mutual communication thereof due to this cutting, so that the conductor portions 2*a* of the flat cable 2 and the core wires 3*a* of the wire 3 are conducted through the respective terminals 7 one by one.

In the connecting structure mentioned above, the wire 3 is positioned on the connecting surface 5*a* through the holder 11 engaged with the engaging portion 12 of the first case body 5. The bus bar 1 and the flat cable 2 are positioned on the connecting surface 5*a* by an engagement between the through holes 7*c* and 2*d* respectively formed in the terminal 7 and the coated portion 2*b*, and the projecting portions 9 and 10 of the first case body 5. Accordingly, the bus bar 1, the flat cable 2 and the wire 3 are mutually positioned. Further, the engaging state of the holder 11, the terminal 7 and the coated portion 2*b* is maintained after cutting the tie bar 8, and the positioning state between the respective terminals 7, and among the wire 3, the terminal 7 and the flat cable 2 is maintained.

Further, in the structure mentioned above, the first case body 5 and the second case body 6 are connected to each other by using the projecting portions 9 and 10 for positioning. Accordingly, no other connecting means for the case body is required, and a simple and compact structure can be obtained.

Figure 4:
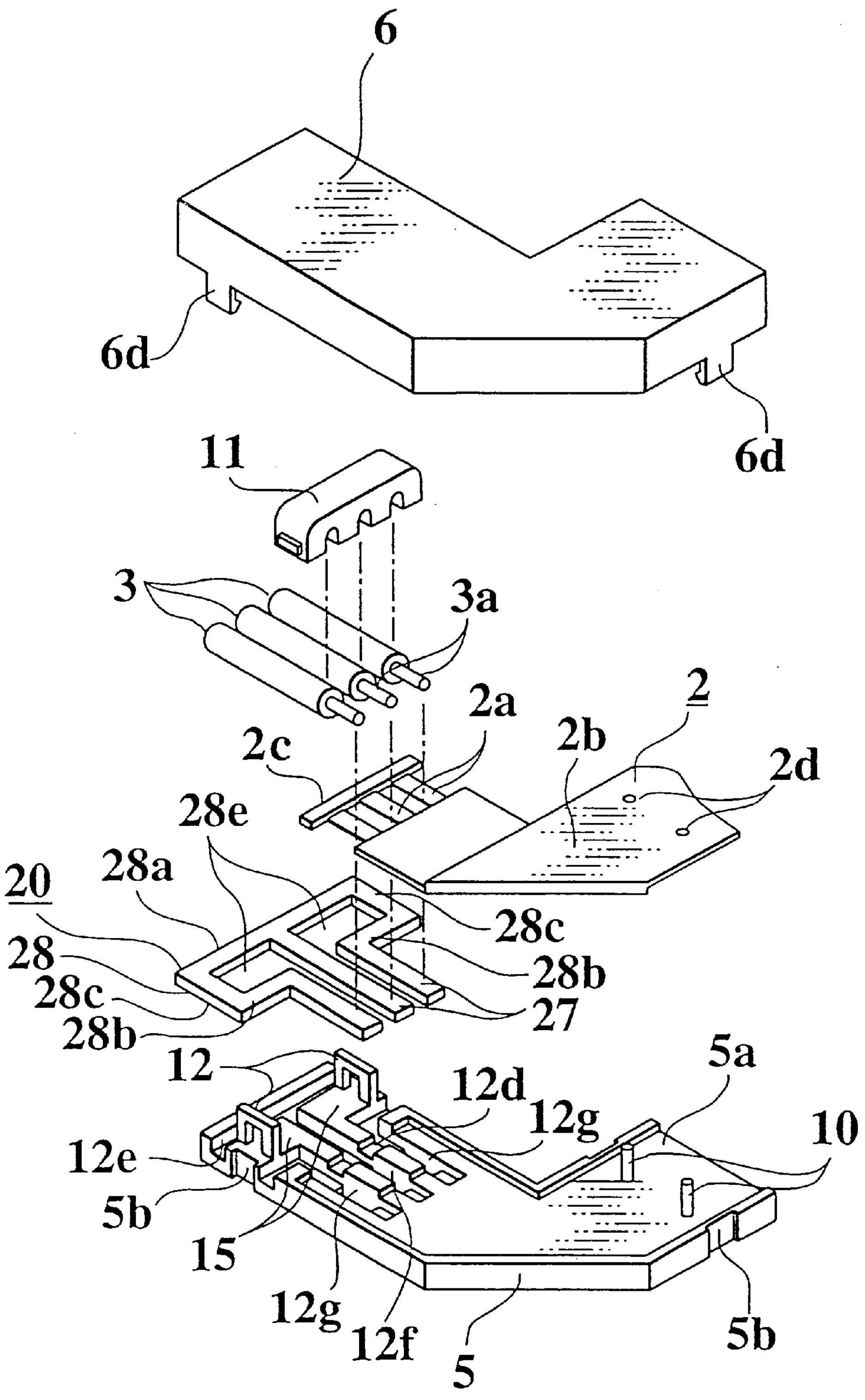
FIG. 4 is an exploded perspective view which shows a connecting structure in accordance with a second embodiment of the present invention.
Figure 5A:
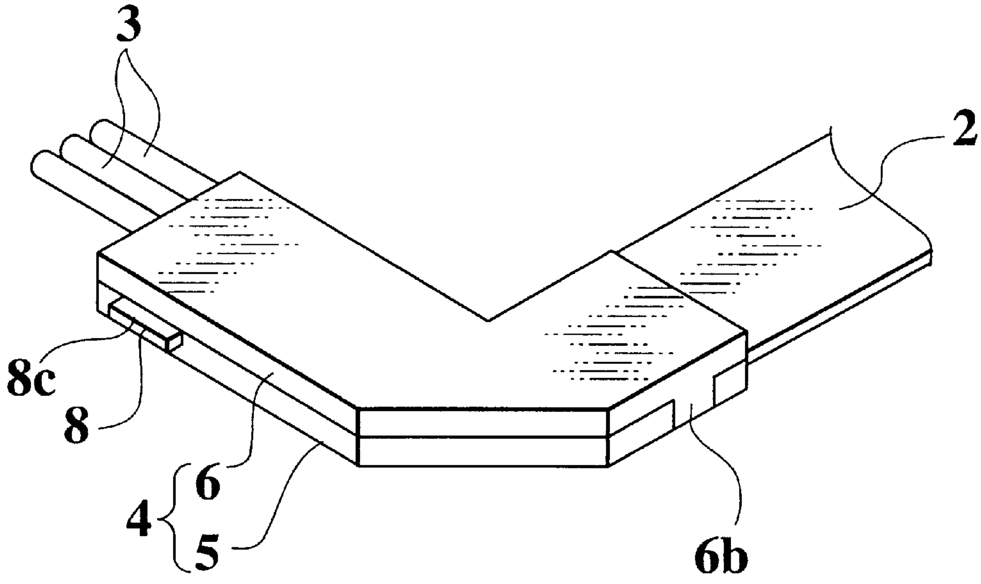
FIG. 5A is a perspective view which shows the first and second case bodies shown in FIG. 3 before the tie bar is cut.
Figure 5B:
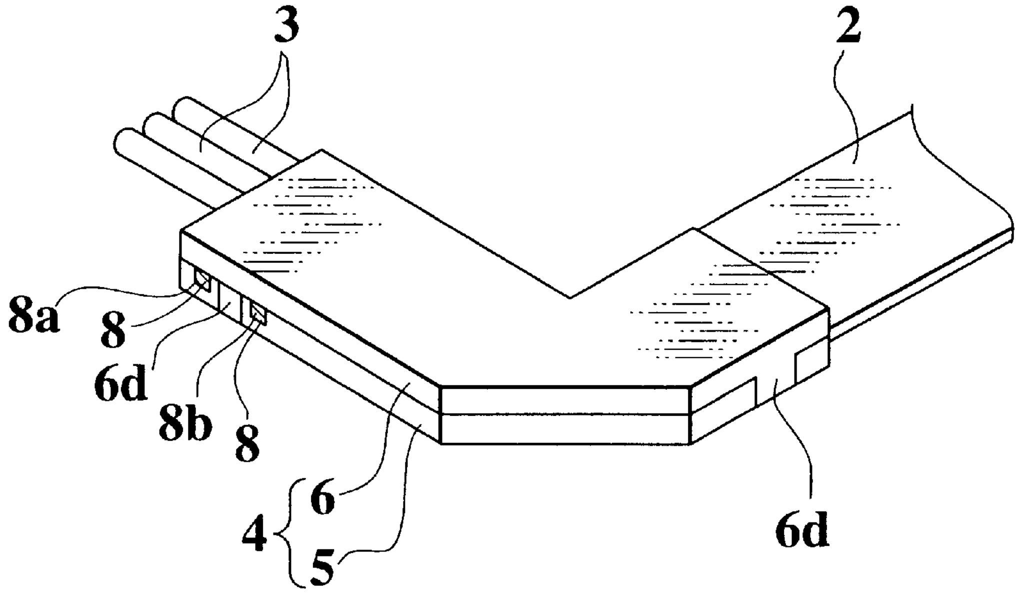
FIG. 5B is a perspective view which shows the first and second case bodied shown in FIG. 4 after the tie bar is cut.

A connecting structure in accordance with a second embodiment will be shown in FIGS. 4, 5A and 5B. The conductor wire connecting structure has a structure the same as that of the first embodiment except an engaging structure of a bus bar 20 and a connecting structure between the first case body 5 and the second case body 6. Accordingly, the same reference numerals are attached to the same elements as those of the first embodiment, and the description thereof will be omitted.

The bus bar 20 is provided with three terminals 27 disposed in parallel and a tie bar 28. The tie bar 28 is formed in a loop shape within the same as the terminal 27. The tie bar 28 integrally connects three terminals 27 to each other. The tie bar 28 has a first edge portion 28*a*, both side edge portions 28*c* and 28*c* bent and extending from both end portions of the first edge portion 28*a* in a perpendicular manner, and second edge portions 28*b* and 28*b* bent and extending from each of the end portions of the both side edge portions 28*c* and 28*c* in a perpendicular manner. Three terminals 27 are structured such that a center is long and both sides are short. The central terminal 27 extends from a substantially center portion of the first edge portion 28*a*. The both side terminals 27 and 27 extend from the end portions of the second edge portions 28*b* and 28*b*. L-shaped space portions 28*e* and 28*e* open at the other end side of the terminal 27 are formed in both sides of the central terminal 27.

A first lateral groove portion 12*e* crossing the first case body 5 in a widthwise direction, a central vertical groove portion 12*f* perpendicular to the first groove portion 12*e*, and L-shaped side groove portions 12*g* and 12*g* positioned in both sides of the central vertical groove portion 12*f* and having a symmetrical shape are formed in an end of the connecting surface 5*a* of the first case body 5. Projecting portions 15 and 15 having an L-shaped block shape and serving as a second engaging portion surrounded by the first lateral groove portion 12*e*, the central vertical groove portion 12*f* and each of the side groove portions 12*g* and 12*g* are formed in both sides of the central vertical groove portion 12*f*. The engaging portion 12 engaging with the holder 11 is formed in each of the projecting portions 15. The second lateral groove portion 12*d* fitting the remaining coated portion 2*c* of the flat cable 2 at a time of setting is formed in such a manner as to cross a part of each of the projecting portions 15.

The engaging recess portion 5*b* is formed in both side portions of an end and the other end of the first case body 5. The engaging pawl 6*d* engaging with the engaging recess portion 5*b* is formed in the second case body 6.

The bus bar 20 is set to the first case body 5 in accordance that each of the projecting portions 15 and 15 is fitted to each of the space portions 28*e* and 28*e*. In this set state, the first edge portion 28*a* of the tie bar 28 is fitted to the first lateral groove portion 12*e*, the central terminal 27 is fitted to the central vertical groove portion 12*f*, the L-shaped continuous portion of each of the second edge portions 28*b* and 28*b* of the tie bar 28 and each of the terminals 27 in both sides is fitted to each of the side groove portions 12*g* and 12*g*, and both side edge portions 28*c* and 28*c* of the tie bar 28 are positioned outward along the both side portions of the first case body 5.

The flat cable 2 and the wire 3 are set to the first case body 5 in the same manner as the first embodiment.

The core wire 3*a* of the wire 3 is put on a layered portion between the terminal 27 of the bus bar 20 and the conductor portion 2*a* of the flat cable 2 so as to be positioned. The piled core wire 3*a*, terminal 27 and conductor portion 2*a* are simultaneously connected by, for example, a ultrasonic irradiation for one time.

After the connection mentioned above, the first case body 5 and the second case body 6 are joined with each other, and a part of the tie bar 28 is cut and removed.

A joint between the first case body 5 and the second case body 6 is performed by engaging the engaging pawl 6*d* with the engaging recess portion 5. In the joined state, as shown in FIG. 5A, the both side edge portions 28*c* and 28*c* of the tie bar 28 are positioned outward along the both side portions of the case body 4. The both side edge portions 28*c* and 28*c* are cut and removed by a means such as a press and the like after the joining or at a time of the joining. A state after cut and removed is shown in FIG. 5B.

A plurality of terminals 27, 27 and 27 are mutually broken the communication with each other by cutting, so as to become independent from each other, so that the conductor portion 2*a* of the flat cable 2 and the core wire 3*a* of the wire 3 are conducted through each of the terminals 27 one by one.

In the connecting structure mentioned above, the bus bar 20 is positioned by an engagement between the bus bar 20 and the projecting portion 15 of the first case body 5. The wire 3 is positioned through the holder 11 engaged with the engaging potion 12 of the first case body 5. The flat cable 2 is positioned by an engagement between the flat cable 2 and the projecting portion 10 of the first case body 5. Accordingly, the bus bar 20, the flat cable 2 and the wire 3 are mutually positioned. Further, even after the tie bar 28 is cut, an engaging state is maintained. Accordingly, the central terminal 27 after cut forms a T-shaped body by continuing with the first edge portion 28*a*, and engages with the first lateral groove portion 12*e* and the central vertical groove portion 12*f*. Further, the both sides terminals 27 and 27 after cut form an L-shaped body by continuing with each of the second edge portions 28*b* and 28*b* so as to engage with each of the side groove portions 12*g* and 12*g*. Accordingly, the mutual positioning state between the respective terminals 27 and among the wire 3, the terminal 27 and the flat cable 2 is maintained.

Further, since the bus bar 20, the flat cable 2 and the wire 3 are put thereon and connected, all the members are connected by a connecting operation for one time, so that a connection can be made simple.

Still further, the second case body 6 can be easily taken out from the first case body 5 by canceling an engagement between the engaging pawl 6*d* and the engaging recess portion 5*b*. Accordingly, a maintenance operation can be easily performed.

Furthermore, in the first and second embodiments, the mutual positioning among the wire 3, the bus bar 1 or 20 and the flat cable 2 can be achieved by a structural engagement between each of the members and the case body 4 without using an insert molding. Accordingly, an insert molding process and a metal molding for an insert molding are not required, so that an operability can be improved and a cost can be reduced.

Moreover, in the first and second embodiments, the wire 3, the bus bar 1 or 20 and the flat cable 2 are held in a state of being positioned within the case body 4. Accordingly, a strength against a tension applied to the wire 3 and the flat cable 2 is high, so that an insert molding is not required also in this view.

What is claimed is:

1. A connecting structure between a flat cable and wires, comprising:

a flat cable having first conductors and a first insulated coating for covering the first conductors, the first conductors including first connecting portions exposed at an end portion of the flat cable from the first coating;

a plurality of wires, each of the wires having a second conductor and a second insulated coating for covering the second conductor, and the second conductor including second connecting portion exposed at an end portion of the wire from the second coating;

a bus bar having terminals and a tie bar, the terminals being disposed within a predetermined plane in parallel, the tie bar integrally connecting the terminals within the predetermined plane, and the tie bar including a removed portion cut away such that the terminals are mutually out of contact with each other;

a holder for positioning the end portions of the wires with respect to the terminals; and a case comprising a first case body and a second case body, the second case body being mounted to the first case body so as to cover a connecting surface of the first case body, the first case body having a first engaging portion engageable with the holder, a second engaging portion engageable with the bus bar and a third engaging portion engageable with the flat cable, the terminals respectively being positioned at predetermined positions on the connecting surface when the bus bar is engaged with the second engaging portion, the holder positioning the wires with respect to the bus bar on the connecting surface when the holder is engaged with the first engaging portion, the flat cable being positioned with respect to the bus bar on the connecting surface when the flat cable is engaged with the third engaging portion, the second connecting portions positioned by an engagement between the holder and the first engaging portion being respectively connected to the terminals, the first connecting portions positioned by an engagement between the flat cable and the third engaging portion being respectively connected to the terminals, the terminals, the end portions of the wires and the end portions of the flat cable being covered by the second case body when the second case body is mounted to the first case body, and the removed portion being cut away with the first and second connecting portions connected to the terminals.

2. A connecting structure according to claim 1, wherein the second engaging portion is engaged with remaining portions of the bus bar except the removed portion, and an engagement between the second engaging portion and the remaining portions holds the terminals at the predetermined positions when the removed portion is cut away.

3. A connecting structure according to claim 1, wherein the tie bar has a loop shape.

4. A connecting structure according to claim 1, wherein the terminals respectively have first through holes, and the second engaging portion comprises a first projection fitted in the first through holes and disposed on the connecting surface.

5. A connecting structure according to claim 1, wherein the flat cable has a through hole cooperative with the third engaging portion, and the third engaging portion is a projection fitted in the cooperative through hole of the flat cable and disposed on the connecting surface.

6. A connecting structure according to claim 3, wherein the second engaging portion is a protruding portion fitted in a space surrounded by the tie bar and disposed on the connecting surface.

7. A connecting structure according to claim 4, wherein the second case body has a through hole cooperative with the first projection;

a tip of the first projection is inserted into the cooperative through hole of the second case body and projects from the second case body when the second case body covers the connecting surface of the first case body, and the tip of the first projection projecting from the second case body is thermally welded to the second case body, whereby the second case body is fixed to the first case body.

8. A connecting structure according to claim 5, wherein the second case body has a through hole cooperative with the projection of the third engaging portion, a tip of the projection of the third engaging portion is inserted into the cooperative through hole of the second case body and projects from the second case body when the second case body covers the connecting surface of the first case body, and the tip of the projection of the third engaging portion projecting from the second case body is thermally welded to the second case body, whereby the second case body is fixed to the first case body.

9. A connecting structure according to claim 1, wherein the second connecting portions are overlapped on the first connecting portions on the terminals.

10. A connecting structure according to claim 1, wherein one of the first and second case bodies has an engaging recess portion, the other of the first and second case bodies has an engaging claw engageable with the engaging recess portion, and the second case body is fixed to the first case body when the engaging claw is engaged with the engaging recess portion.

11. A connecting structure according to claim 1, wherein the second conductor is constituted by a plurality of core wires.

12. A connecting structure according to claim 1, wherein one of the first and second case bodies has a through hole cooperative with a cutting device, and the removed portion covered by the second case body is cut away by the cutting device inserted into the cooperative through hole of one of the first and second case bodies after the second case body is fixed to the first case body.

13. A connecting structure according to claim 1, wherein an ultrasonic weld connects the second connecting portions to the terminals.

14. A connecting structure according to claim 1, wherein an ultrasonic weld connects the first connecting portions to the terminals.

15. A connecting structure according to claim 1, wherein the first engaging portion is an inverse-U shaped engaging portion engageable with an engaging pawl of the holder.

16. A connecting structure according to claim 1, wherein the second engaging portion is engageable with the second case body.

17. A connecting structure according to claim 16, wherein the second case body has a through hole engageable with the second engaging portion.

18. A connecting structure according to claim 1, wherein the third engaging portion is engageable with the second case body.

19. A connecting structure according to claim 18, wherein the second case body has a through hole engageable with the third engaging portion.

* * * * *